(12) United States Patent
Sundt et al.

(10) Patent No.: US 8,174,967 B2
(45) Date of Patent: May 8, 2012

(54) METHOD TO REDUCE ROUTING CONVERGENCE AT THE EDGE

(75) Inventors: Mark Sundt, Red Bank, NJ (US); James Uttaro, Staten Island, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 36 days.

(21) Appl. No.: 12/286,478

(22) Filed: Sep. 30, 2008

(65) Prior Publication Data
US 2010/0061227 A1 Mar. 11, 2010

Related U.S. Application Data

(63) Continuation-in-part of application No. 12/283,334, filed on Sep. 11, 2008, now Pat. No. 7,957,289.

(51) Int. Cl.
*G06F 11/00* (2006.01)
(52) U.S. Cl. .................... 370/221; 370/217; 370/228
(58) Field of Classification Search .............. 370/221, 370/216, 217, 225, 227, 228
See application file for complete search history.

(56) References Cited

U.S. PATENT DOCUMENTS

| | | | |
|---|---|---|---|
| 7,580,417 B2 | 8/2009 | Ervin et al. | |
| 2004/0177157 A1 | 9/2004 | Mistry et al. | |
| 2006/0164975 A1* | 7/2006 | Filsfils et al. | 370/225 |
| 2007/0121486 A1* | 5/2007 | Guichard et al. | 370/216 |
| 2007/0208874 A1 | 9/2007 | Previdi et al. | |
| 2007/0223486 A1 | 9/2007 | Farid et al. | |
| 2008/0198849 A1 | 8/2008 | Guichard et al. | |
| 2008/0219277 A1 | 9/2008 | Pratap et al. | |
| 2009/0154373 A1 | 6/2009 | Ye et al. | |
| 2010/0061381 A1 | 3/2010 | Sundt et al. | |

OTHER PUBLICATIONS

United States Patent and Trademark Office, "Non-Final Office Action," issued in connection with U.S. Appl. No. 12/283,334, mailed Oct. 21, 2010, 6 pages.
United States Patent & Trademark Office, "Office Action" issued in connection with U.S. Appl. No. 12/283,334, mailed Feb. 25, 2010 (8 pages).
United States Patent & Trademark Office, "Notice of Allowance and Fees Due" issued in connection with U.S. Appl. No. 12/283,334, mailed Jun. 15, 2010 (6 pages).

* cited by examiner

*Primary Examiner* — Luat Phung
(74) *Attorney, Agent, or Firm* — Hanley, Flight and Zimmerman, LLC

(57) ABSTRACT

In a network comprising a provider edge router coupled to each of a mated pair of core routers in a core network, a system and methodology for rerouting upstream traffic destined for the provider edge router in the event of a link failure between one of the core routers and the provider edge router. By detecting a link failure between a first of the mated pair of core routers and the provider edge router, and directing the upstream traffic destined for the provider edge router to a second of the mated pair of core routers, internal gateway protocol (IGP) reconvergence events are not triggered.

7 Claims, 7 Drawing Sheets

US 8,174,967 B2

METHOD TO REDUCE ROUTING CONVERGENCE AT THE EDGE

CROSS REFERENCE TO RELATED APPLICATIONS

This application is a continuation-in-part and claims the benefit of U.S. application Ser. No. 12/283,334, entitled "Method to Reduce IGP Routing Information," filed Sep. 11, 2008 now U.S. Pat. No. 7,957,289.

FIELD OF THE INVENTION

The present invention relates generally to computer networking, and more particularly, to a system and method for reducing router reconvergence events in a network.

BACKGROUND OF THE INVENTION

The use of Computing Devices (CDs) and computer networks are an integral part of personal, corporate and government communication. A computer network is a collection of physically distributed sub-networks, such as local area networks (LANs) that transport data between network nodes. A node may be loosely defined as a device adapted to send and/or receive data in the computer network. Therefore, a node may be the source of data to be transported, the destination for data being transported or a location through which data may travel on its way from source to destination.

Network topology is the representation and arrangement of network elements, including links and nodes, and the physical and logical interconnections between nodes. A LAN is an example of a network that exhibits both a physical topology and a logical topology. Any given node in a LAN will have one or more physical links to one or more other nodes in the network typically through one or more intermediate nodes, such as routers and switches, thus defining the physical topology. Likewise, the mapping of the flow of data between the nodes in the network determines the logical topology of the network. The physical and logical topologies might be identical in any particular network, but they also may be different.

Data may be exchanged via intra-network communications, that is within one network, and may also be exchanged inter-network, that is between neighboring (i.e., logically and/or physically adjacent) networks. In that regard, "edge devices" located at the logical outer boundaries of the computer network may be adapted to send and receive internetwork communications. Both inter-network and intra-network communications are typically effected by exchanging discrete packets of data according to predefined protocols. In this context, a protocol consists of a set of rules defining how network nodes interact with each other.

FIG. 1 is a schematic of an illustrative prior art Virtual Private Network (VPN) 100, as is well known by those skilled in the art. A VPN is a computer network that is a collection of network nodes that establish private communications over a shared backbone network. VPNs effectively tunnel through another network for security reasons or to separate traffic from various users. Routing devices, generically referred to by their primary purpose, such as customer edge routers, core routers and the like, utilize a defined protocol that specifies how routers will communicate with other routers to receive and send information via selected routes between nodes on a network. The term routing protocol may refer more specifically to a protocol operating at Layer 3 of the Open Systems Interconnection (OSI) model, which distributes network topology information among routers.

Referring to FIG. 1, Customer Edge ($CE_1$ and $CE_2$) routers 102 located at a customer premises, are in turn are connected to Provider Edge ($PE_1$ and $PE_2$) routers 104 of a service provider Internet Protocol/Multiple Protocol Label Switching (IP/MPLS) network. CE routers communicate or peer with the PE routers through a corresponding Virtual Routing and Forwarding (VRF) attachment circuit. The PE router resides between one network service provider's area and areas administered by other network providers.

In Multi-Protocol Label Switching (MPLS) networks, a P router (106), which is typically referred to as a provider core router, is a Label Switch Router (LSR) that functions as a transit router of the core network. A PE router is typically connected to one or more P routers. In the illustrative network 100 of FIG. 1, six P routers 106 ($P_1, P_2, P_3, \ldots P_6$) are shown, with each PE router 104 ($PE_1, PE_2$), connected by a physical link to core routers $P_1, P_2$ and $P_3, P_4$, respectively.

In the current state of the art, the provider edge routers 104 ($PE_1, PE_2$) utilize the internal Border Gateway Protocol (iBGP) to exchange routing information. The routing information typically includes destination address prefixes and associated path attributes. The routing information via iBGP is exchanged via a Route Reflector (RR) 108 in a manner well known in the art. An Interior Gateway Protocol (IGP) is then employed to resolve traffic routing within an autonomous system, here shown as the paths between the provider edge routers 104 ($PE_1, PE_2$) via the core routers 106 ($P_1, P_2, P_3, \ldots P_6$). One type of IGP is a link-state routing protocol which includes the open shortest path first (OSPF) and the intermediate system-to-intermediate system (IS-IS) protocols. In link-state routing protocols, each node possesses information about the complete network topology. Each node then independently calculates the best path or next hop from it for every possible destination in the network using local information of the topology. The collection of best next hops forms the routing table for the node. Another type of IGP is a distance-vector routing protocol, which works by having each router advertise its distances from other routers and receiving similar advertisements from other routers such that each router populates its routing table. This process continues in cycles until the routing tables of each router converge to stable values.

The Link-state advertisement (LSA) is a basic communication means of the OSPF routing protocol. It advertises or communicates the router's local routing topology to all other local routers in the same OSPF area. OSPF is designed for scalability, so some LSAs are not flooded out on all peered links, but only on those that belong to the appropriate area. In this way detailed information can be kept localized, while summary information is flooded to the rest of the network. Nevertheless, as provider edge routers are added to the network, a very large amount of state information needs to be maintained.

In current networks, where every node is treated as an equal IGP peer, every link failure, including a PE-P link failure, causes a network-wide reconvergence event. The current methodology for minimizing outages from link failures is known as MPLS Fast Re-Route (FRR). With reference to FIG. 2, in accordance with FRR, a primary tunnel is established between core router 206 $P_2$ and provider edge router 204 $PE_1$. A backup tunnel for $P_2$-$P_1$-$PE_1$ is preconfigured in the event of a primary tunnel failure. However, such tunnels require that all PE routers be part of the IGP. When a primary tunnel fails (i.e., the link between $P_2$ and $PE_1$), traffic is automatically sent through the preconfigured backup tunnel. Additionally, a network-wide IGP reconvergence event is thereafter triggered due to the physical link failure that caused the primary tunnel failure, causing additional traffic to be rerouted and another traffic hit.

FIG. 3 shows a full mesh of Fast Re-Route tunnels between routers $PE_2$ and $PE_1$ 304 via a defined set of core routers 306. In accordance with this configuration, a primary tunnel is established for steady-state traffic flow utilizing core routers 306, $P_4$-$P_6$-$P_2$. Additionally, a backup tunnel utilizing core routers 306, $P_3$-$P_5$-$P_1$ is established in the event of a primary tunnel failure. Furthermore the process of establishing primary and backup tunnel is repeated for all other PEs in a given network. Label distribution Protocol (LDP) is a protocol which relies on underlying routing information provided by the IGP in order to forward label packets which are ultimately used to forward traffic through MPLS networks. The tunnels, both primary and backup, can be setup automatically or statically. When the primary tunnel fails, traffic is automatically sent through the backup tunnel. Just as in the case of MPLS Fast Re-Route (FRR) of FIG. 2, when a full mesh of Fast Re-Route tunnel configuration of FIG. 3 is utilized, and when the primary tunnel fails, traffic is automatically sent through the preconfigured backup tunnel and a network-wide IGP reconvergence event is thereafter triggered, causing additional traffic to be rerouted and another traffic hit.

It would therefore be desirable to eliminate reconvergence events for PE-P link failures by taking advantage of an architecture having a pre-defined "mated pair" of core routers for each PE router where the PE-P links reside outside of the IGP. To the inventors' knowledge, no such system or method currently exists.

SUMMARY OF THE INVENTION

In accordance with a first aspect of the present invention, in a network comprising a provider edge router coupled to each of a "mated pair" of core routers in a core network, there is disclosed a method for rerouting downstream traffic destined for the provider edge router in the event of a link failure between one of the core routers and the provider edge router. The method comprises the steps of detecting a link failure between a first of the mated pair of core routers and the provider edge router; and directing the upstream traffic destined for the provider edge router to a second of the mated pair of core routers without triggering an internal gateway protocol (IGP) reconvergence event.

The IGP may run exclusively on the core routers in the core network to disseminate routing information among the core routers. However, the IGP does not run on the provider edge router.

The provider edge router does not maintain a database of state information for the core routers in the core network.

In accordance with a second aspect of the present invention, there is disclosed a network in which traffic is routed from an ingress provider edge router to an egress provider edge router, the network eliminating the need to share state information between both the ingress and egress provider edge routers and the plurality of core routers in a core network. The ingress provider edge router and egress provider edge router are each coupled to first and second core routers forming a mated pair of core routers among the plurality of core routers in the core network. The first core router of the mated pair is coupled to the egress provider edge router, and is constructed and arranged for detecting a link failure between the first core router and the egress provider edge router. The second core router of the mated pair is coupled to the egress provider edge router, and is constructed and arranged for detecting a link failure between the second core router and the egress provider edge router. Upon detection of a link failure between the first core router and the egress provider edge router, the first core router is adapted to send upstream traffic destined for the egress provider edge router to the second core router, and upon detection of a link failure between the second core router and the egress provider edge router, the second core router is adapted to send upstream traffic destined for the egress provider edge router to the first core router. Link failures between the provider edge router and either of the routers in the mated pair do not trigger an internal gateway protocol (IGP) reconvergence event.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
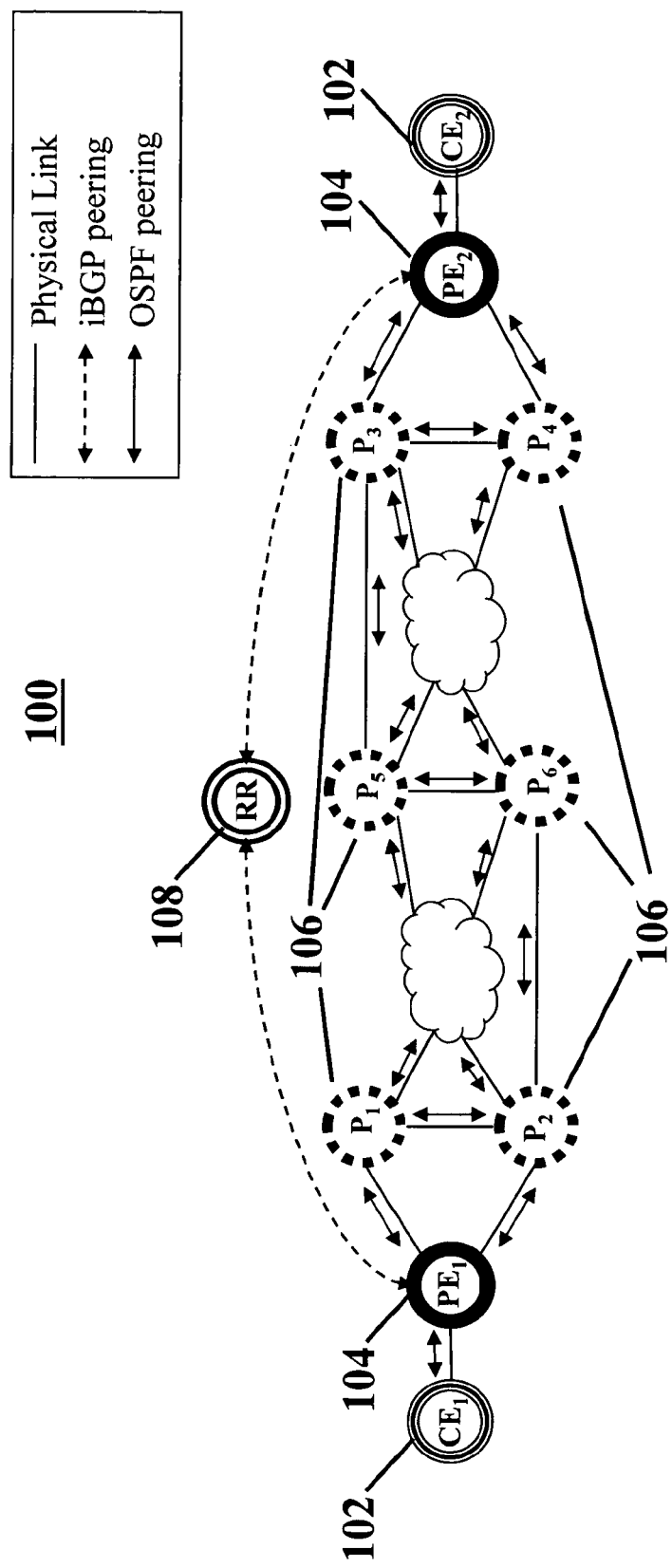
FIG. 1 is a schematic of an illustrative prior art communication network.
Figure 2:
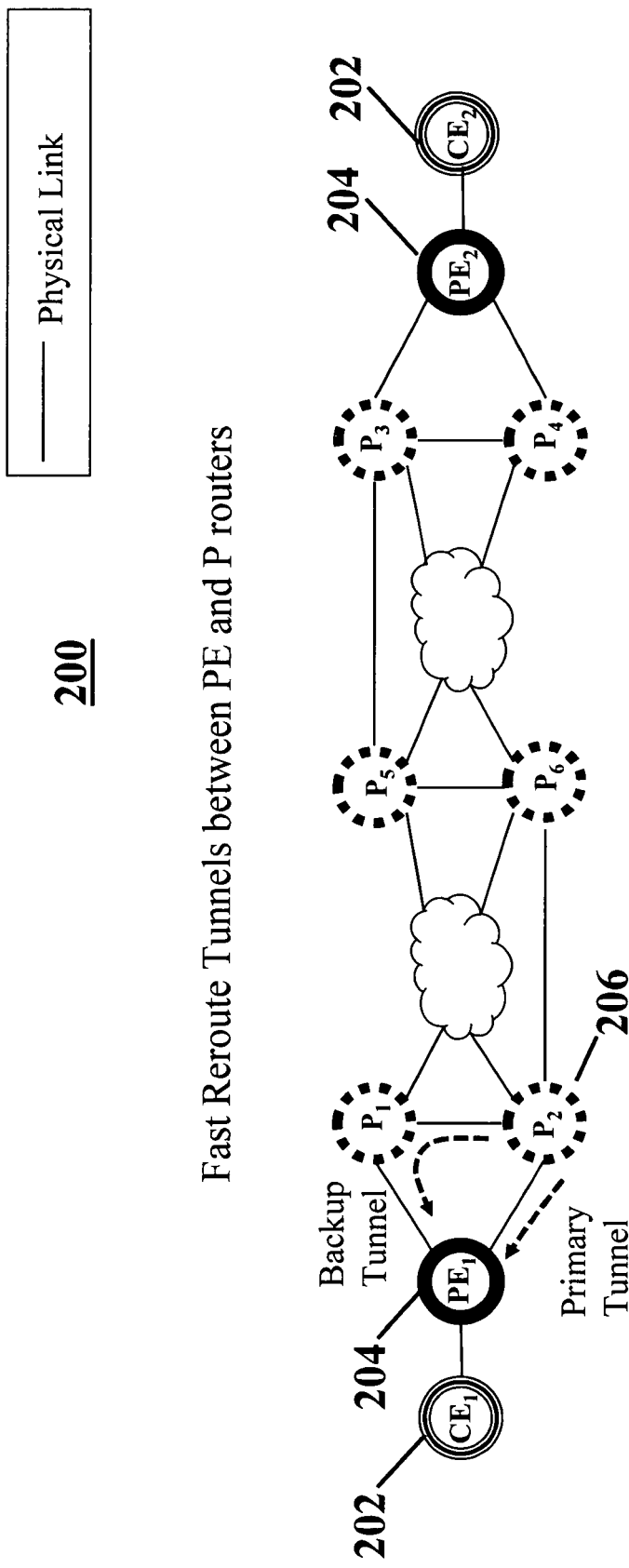
FIG. 2 is a schematic of an illustrative prior art communication network utilizing fast reroute tunnels between PE and P routers.
Figure 3:
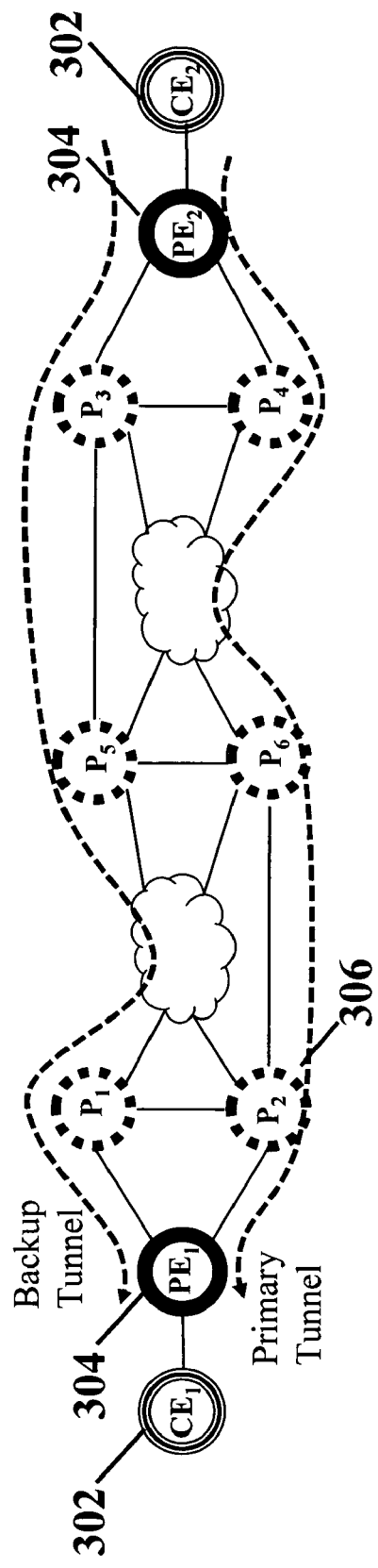
FIG. 3 is a schematic of an illustrative prior art communication network utilizing full mesh of fast reroute tunnels between all PE routers.
Figure 4:
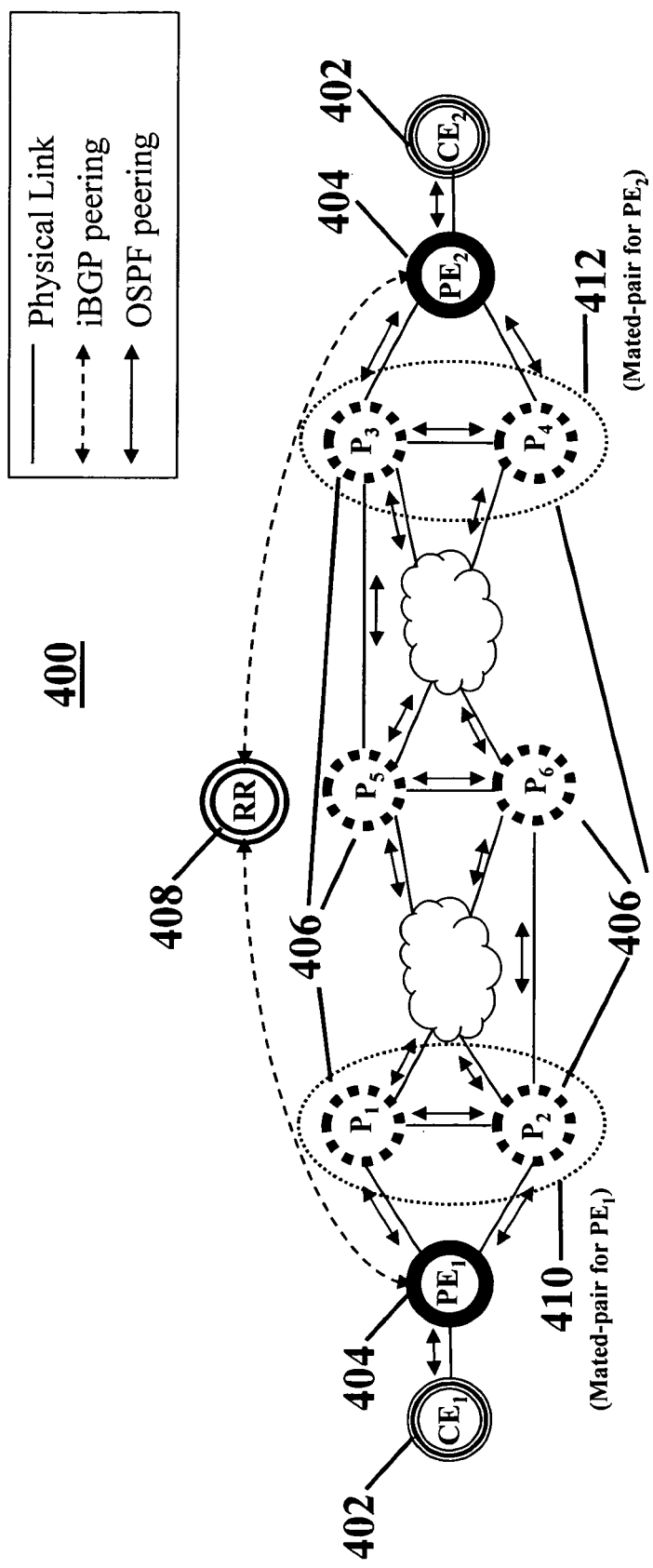
FIG. 4 is a schematic of an illustrative network of the present invention showing nominal traffic flow.

Referring now to FIG. 4, there is depicted an illustrative schematic diagram of a network 400 comprising a pair of Customer Edge (CE) routers 402 ($CE_1$, $CE_2$) coupled to a pair of Provider Edge (PE) routers 404 (PE1, PE2) at edges of a Multi-Protocol Label Switching (MPLS) autonomous system including a plurality of core routers (P) 406 ($P_1, P_2, P_3, \ldots P_6$). In the example shown, a VPN is depicted, which employs a VPNv4 route reflector (RR) 408 for exchanging route information between an ingress PE router and an egress PE router relative to the core via the internal Border Gateway Protocol (iBGP) as is well known in the art. The PE routers in this cooperate to establish a logical peer connection (session). iBGP is an intra-domain routing protocol that typically operates over a reliable transport protocol such as a transmission control protocol (TCP) to establish a TCP connection between routing peers within the autonomous system. Typically, each route between the PE routers 404 ($PE_1$, $PE_2$) that is advertised by the iBGP must have a next hop address that is reachable through an Internal Gateway Protocol (IGP) in order for the route to be considered valid. As discussed above, the IGP is a link state or distance vector protocol. In accordance with an aspect of the present invention, the PE routers 404 ($PE_1$, $PE_2$) do not share state information with the core routers 406 ($P_1$, $P_2$, $P_3$, ... $P_6$), and are thus removed from the IGP process.

As shown in FIG. 4, router $PE_1$ 404 is coupled to a "mated pair" of core routers ($P_1$, $P_2$) 410, while router $PE_2$ 404 is coupled to a mated pair of core routers ($P_3$, $P_4$) 412. For traffic from $CE_1$ to $CE_2$, $PE_1$ is considered to be the ingress PE and $PE_2$ is considered to be the egress PE. For traffic in the opposite direction from $CE_2$ to $CE_1$, $PE_2$ is considered to be the ingress PE and $PE_1$ is considered to be the egress PE. The inventors have discovered that it is possible to improve scalability of the entire network by removing these PE routers from the IGP process. In this regard, assuming $PE_1$ is operating as an ingress PE router, after $PE_1$ learns routes with a next hop equal to the IP address of $PE_2$ (the egress PE router in this case) through iBPG, $PE_1$ applies load balancing over the physical links to $P_1$ and $P_2$ to send incoming traffic to either of these core routers irrespective of the routing protocols utilized between routers $P_1$, $P_2$, $P_3$, $P_4$, $P_5$ and $P_6$. Thus, the routing information base (RIB) that typically holds many routes computed between the core routers 406 need not be included in $PE_1$ and $PE_2$. This RIB for the IGP process only needs to be included in the core routers $P_1$ through $P_6$. This network topology information is exchanged between the core routers using, for example, the Open Shortest Path First (OSPF) protocol, the Intermediate-System-to-Intermediate-System (IS-IS) protocol, or the like. The OSPF protocol is described in detail in Request for Comments (RFC) 2328, entitled OSPF Version 2, April 1998, and the IS-IS protocol is described in more detail in RFC 1195, entitled Use of OSI IS-IS for Routing in TCP/IP and Dual Environments, December 1990.

In the IGP process, a sending router executing the same will generate and disseminate a Link State Advertisement (LSA) containing routing information that includes a list of all of the router's neighbors and one or more cost values associated with each neighbor. The cost value is typically an arbitrary metric that is employed to determine the relative ease or burden of communicating with the neighbor. This may include, but is not limited to, the average number of hops required, average travel time for a packet to travel, and/or amount of bandwidth available over a communications link coupling the routers. The LSAs are "advertised" among the routers so that each router in the network can construct an identical view of the network topology by aggregating the received lists of neighboring routers and associated cost values. This routing information is then input into the OSPF or IS-IS calculation to determine the lowest-cost network paths between routers.

There is no need to maintain a link-state database in the PE routers since these routers are removed from the IGP as described in copending U.S. application Ser. No. 12/283,334, entitled "Method to Reduce IGP Routing Information," filed Sep. 11, 2008, the contents of which are incorporated by reference herein. As discussed above, each PE router is coupled to its respective mated pair of core routers ($P_1$, $P_2$) and ($P_3$, $P_4$). Each core router $P_1$, $P_2$, $P_3$ and $P_4$ maintains a database identifying the respective PE router that is attached to it. The ingress PE router, say $PE_1$ for traffic from $CE_1$, balances traffic flows across the physical uplinks to core routers $P_1$, $P_2$. That is, $PE_1$ streams all traffic to the same IP address ($PE_2$) over two identical cost paths to $P_1$, $P_2$. For example, $PE_1$ may stream one traffic flow over the physical link to $P_1$, while sending another traffic flow over the physical link to $P_2$.

In the context of a VPN, $PE_1$ simply applies a Virtual Route Forwarding (VRF) label at $PE_1$, without adding a destination label. The destination label is added at the ingress P router ($P_1$ or $P_2$). As is well known, the destination label is thereafter removed at the egress P router ($P_3$ or $P_4$).

Figure 5:
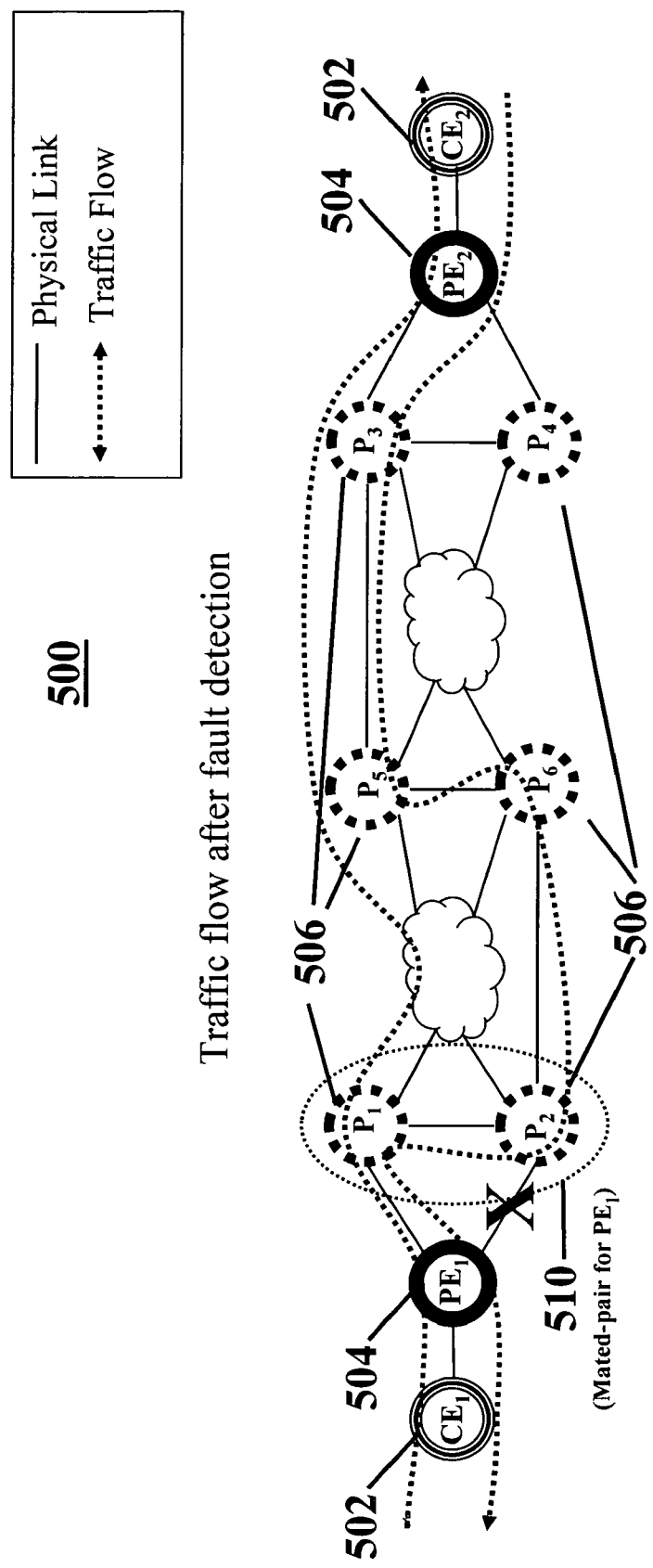
FIG. 5 is a schematic of an illustrative network of the present invention showing traffic flow after fault detection.

Referring again to FIG. 4, an aspect of the invention with respect to link failures between the PE routers and the mated pair of core routers coupled to each PE router will now be described. Since the mated pair-PE links are essentially identical, the following description refers to link failures between mated pair 410 ($P_1$, $P_2$) and $PE_1$ 404. The mated pair arrangement eliminates the need for pre-defined backup tunnels and IGP network reconvergence between $PE_1$ and $P_1$, $P_2$ in the event of a link failure between $PE_1$ and either $P_1$ or $P_2$. Since each PE router has a known mated pair of P routers associated with it, any link failure that occurs between one of the mated pair P routers and the PE router may be addressed by the P router that experiences the link failure by simply directing traffic destined for the PE router to the other P router of the mated pair. Thus, with reference now to FIG. 5, if, for example, the link between $PE_1$ 504 and $P_2$ 506 fails, $P_2$ 506 directs any upstream traffic destined for $PE_1$ 504 to $P_1$ 506 since $P_2$ 506 "knows" that $P_1$ 506 is part of the mated pair 510 for $PE_1$. $P_1$ will then direct the traffic to $PE_1$. Accordingly, no network-wide IGP reconvergence event for the $PE_1$-$P_2$ link failure is necessary, thereby reducing the potential for packet loss. This may result in an asymmetrical traffic flow, such as shown in FIG. 5 with ingress traffic being routed from $PE_1$ to $PE_2$ via path $P_1$-$P_5$-$P_3$, while upstream traffic to $PE_1$ is routed via $P_3$-$P_5$-$P_6$-$P_2$-$P_1$.

Figure 6:
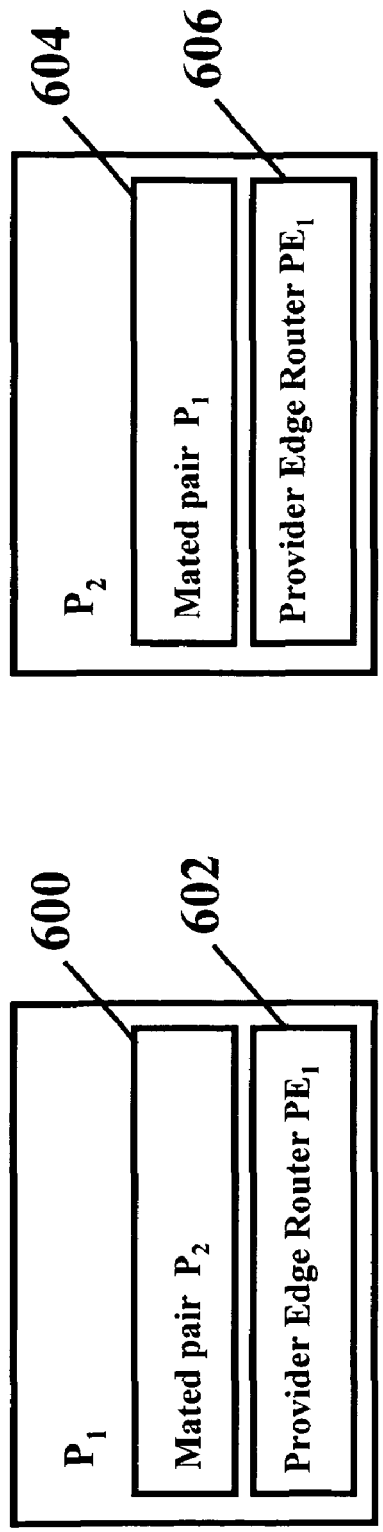
FIG. 6 is a sample data structure for each of a mated pair of core routers in accordance with an aspect of the present invention.

With reference now to FIG. 6, each P node in the "mated pair" ($P_1$, $P_2$) maintains a database of information for any directly connected PE routers (i.e., $PE_1$), as well as the other P router of the "mated pair". This may be implemented via provisioning or can be made discoverable through a protocol. A sample data structure is depicted in FIG. 6, where $P_1$ identifies the other router in the mated pair, $P_2$ (box 600) and provider edge router $PE_1$ (box 602). Similarly, $P_2$ identifies the other router in the mated pair, $P_1$ (box 604) and provider edge router $PE_1$ (box 606).

Figure 7:
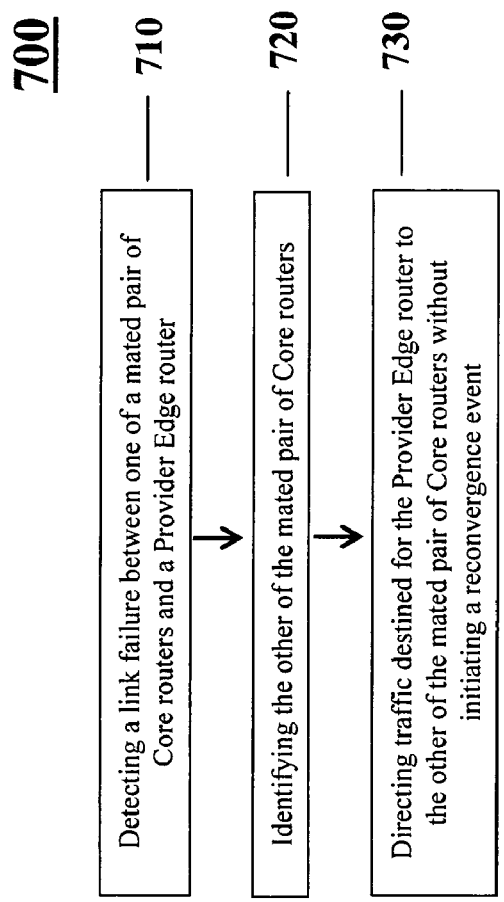
FIG. 7 is a flow chart depicting an exemplary method in accordance with the present invention.

Referring now to FIG. 7, there is shown a flowchart of an illustrative methodology in accordance with an aspect of the present invention. The method enables the rerouting of upstream traffic destined for the provider edge router in the event of a link failure between one of the core routers in the mated pair and the provider edge router. In step 710, one of the core routers in the mated pair detects a link failure between that core router and the provider edge router. In step 720, the router identifies the other router in the mated pair. In step 730, traffic destined for the provider edge router is rerouted to the other of the core routers in the mated pair without initiating a reconvergence event.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. In a multiprotocol label switching network comprising a provider edge router communicatively coupled to each of a pair of core routers of a core network, a method comprising:
    detecting at a first of the pair of core routers a link failure between the first of the pair of core routers and the provider edge router; and
    directing upstream traffic destined for the provider edge router from the first of the pair of core routers to the provider edge router via a second of the pair of core routers in response to the detected link failure, the first of the pair of core routers provisioned to direct the upstream traffic to the provider edge router via the second of the pair of core routers without knowledge of network topology in the core network based on a mapping table, the mapping table identifying the provider edge router as a directly connected edge router and identifying the second of the pair of core routers as a mated pair core router for the upstream traffic destined for the directly connected provider edge router.

2. The method of claim 1, wherein the detected link failure does not affect any routing table at the provider edge router.

3. The method of claim 1, wherein the provider edge router does not maintain a database of state information for the core routers of the core network.

4. A multiprotocol label switching network comprising:
    a provider edge router; and
    first and second core routers of a core network communicatively coupled to the provider edge router, the first core router to detect a link failure between the first core router and the provider edge router and to route traffic received at the first core router to the provider edge router via the second core router after the link failure is detected, the first core router provisioned to route the traffic to the provider edge router via the second core router without knowledge of network topology in the core network based on a mapping table, the mapping table identifying the provider edge router as a directly connected edge router and identifying the second core router as a mated pair core router for the upstream traffic destined for the directly connected provider edge router.

5. The network of claim 4, wherein the detected link failure does not affect any routing table at the provider edge router.

6. The network of claim 4, wherein the provider edge router does not maintain a database of state information for the first and second core routers of the core network.

7. The network of claim 4, wherein the second core router is to detect a second link failure between the second core router and the provider edge router, and route traffic received at the second core router and destined for the provider edge router to the provider edge router via the first core router when the second link failure is detected.

* * * * *